(12) United States Patent
Froehlich

(10) Patent No.: US 8,960,052 B2
(45) Date of Patent: Feb. 24, 2015

(54) DEVICE FOR EXPOSING AN OPENING IN A HOUSING PART OF A STEERING GEAR

(71) Applicant: ZF Lenksysteme GmbH, Schwaebisch Gmuend (DE)

(72) Inventor: Stefan Froehlich, Zimmerbach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/961,226

(22) Filed: Aug. 7, 2013

(65) Prior Publication Data

US 2014/0007738 A1    Jan. 9, 2014

Related U.S. Application Data

(63) Continuation of application No. PCT/EP2012/052666, filed on Feb. 16, 2012.

(30) Foreign Application Priority Data

Mar. 28, 2011   (DE) .......................... 10 2011 001 591

(51) Int. Cl.
*F16H 57/04* (2010.01)
*F16H 57/02* (2012.01)
*B62D 3/12* (2006.01)
*B62D 3/00* (2006.01)
*F16H 57/027* (2012.01)

(52) U.S. Cl.
CPC ...... *F16H 57/02* (2013.01); *B62D 3/12* (2013.01); *B62D 3/00* (2013.01); *F16H 57/027* (2013.01)
USPC ........................................................ 74/606 R

(58) Field of Classification Search
USPC ................... 74/496, 498, 606 R; 280/93.514, 280/93.515; 137/131
See application file for complete search history.

(56) References Cited

U.S. PATENT DOCUMENTS

| | | | | |
|---|---|---|---|---|
| 4,922,960 A | * | 5/1990 | Oelschlaegel | ................ 137/588 |
| 6,378,779 B1 | * | 4/2002 | Taylor | ............................. 239/63 |
| 7,753,383 B2 | * | 7/2010 | Bareis et al. | ............. 280/93.514 |

FOREIGN PATENT DOCUMENTS

| | | |
|---|---|---|
| DE | 10 2006 006 679 | 4/2007 |
| DE | 10 2006 036 214 | 2/2008 |
| DE | 10 2007 015 327 | 10/2008 |
| DE | 10 2007 015 329 | 10/2008 |
| DE | 10 2008 048 813 | 4/2010 |
| DE | 10 2009 002 000 | 10/2010 |
| JP | 63-101180 | 5/1988 |

\* cited by examiner

*Primary Examiner* — Vicky Johnson
(74) *Attorney, Agent, or Firm* — Jordan and Hamburg LLP

(57) ABSTRACT

A device for exposing at least one opening in a housing part of a steering gear in a vehicle steering system is provided with a closure element, which closes the opening, and an operating element. At least one of the properties of the operating element changes when coming in contact with a liquid so that the opening can be exposed by the closure element after cooperation of the operating element with the closure element. The closure element is at least partially covered by a cover part and is designed as a buoyant body, or is provided with one or more buoyant bodies, wherein the cover part completely exposes the opening when liquid makes contact with the cover part.

6 Claims, 3 Drawing Sheets

DEVICE FOR EXPOSING AN OPENING IN A HOUSING PART OF A STEERING GEAR

This is a Continuation of PCT/EP2012/052666 filed Feb. 16, 2013.

The invention relates to a device for exposing at least one opening in a housing part of a steering gear in a vehicle steering system.

BACKGROUND OF THE INVENTION

A device having this embodiment is known from DE 10 2006 006 679 A1. Steering gears for motor vehicles are generally sealed with respect to the surrounding area by way of bellows in the region of the connection of a toothed rack to tie rods.

One problem exists that bellows can be damaged, for example by animal bites, impact from rocks, tools or other negative influences, whereby the entire steering system is no longer sealed with respect to the surroundings. As a result, moisture and water can penetrate into the steering gear. If the damaged site is not located at the lowest point of the steering gear, the penetrating water will not drain automatically, but rather collects in the interior of the steering housing. However, the water that has penetrated is damaging to the operating elements of the steering gear and can even result in malfunctions.

It has therefore already been proposed in DE 10 2006 006 679 A1 to provide a device at the lowest point of the housing of the steering gear, the device being provided with a closure element and an operating element, at least one of the properties of which changes after coming in contact with a liquid, for example water, so that after cooperation of the operating element with the closure element, the closure element exposes an opening through which the liquid, which is water, can drain from the interior of the steering housing.

So as to change the properties of the operating element, by way of which the at least one opening is exposed, it has been proposed, for example, for the operating element to increase the volume thereof, thereby pushing the closure element out of the previously closed opening.

Another solution that has been proposed is for the operating element to destroy the closure element or for the operating element to dissolve on its own. The at least one opening has also been exposed in these two instances.

However, it has been found that the operating element, in particular if this is a water-soluble element, may also respond when extreme atmospheric moisture is present, such as that which may occur during vehicle tests, for example, whereby inadvertent opening of the valve may result.

SUMMARY OF THE INVENTION

Therefore, it is the object of the invention to improve said device so that it only reacts when water enters, but not to atmospheric moisture.

The cover part, which covers the closure element and thus also the water-sensitive operating element, assures that no moisture can reach the closure element and the operating element. Only when water has penetrated into the steering gear does the cover part expose access to the water-sensitive operating element by way of the buoyant body or bodies, and only then do said properties of the operating element occur, whereby the closure element exposes the opening.

A variety of solutions are possible for designing the cover part. It is only essential that atmospheric moisture is effectively prevented from accessing the operating element and that the cover part does not expose access to the operating element until water is present.

The cover part can be designed as a diaphragm, for example.

Advantageous refinements and embodiments will be described hereafter in terms of the principle based on the drawings.

DESCRIPTION OF THE PREFERRED EMBODIMENTS

Vehicle steering systems of the type described above and devices for exposing an opening in a housing part of the steering gear are generally known, which is why only the parts that are essential for the invention will be described hereafter in greater detail. Reference is made for this purpose to DE 10 2006 006 679 A1 mentioned earlier. The solution according to the invention, comprising a cover part, can generally be employed for all the exemplary embodiments described therein.

Figure 1:
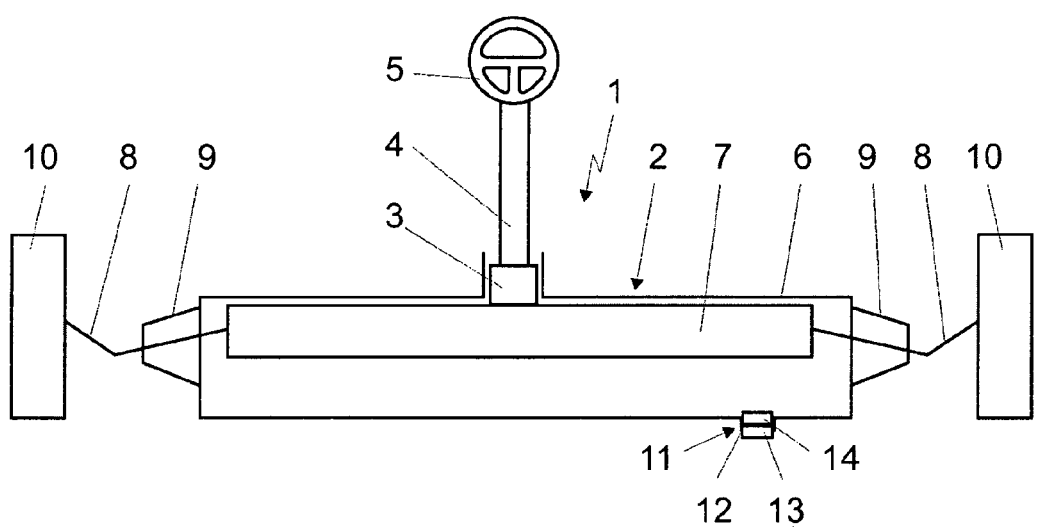
FIG. 1: shows a simplified schematic illustration of a vehicle steering system.

The vehicle steering system 1, which is shown in a very simplified illustration in FIG. 1, comprises a steering gear 2, the input side of which has a pinion 3, a steering column 4 and a steering wheel 5.

A toothed rack 7, which can be displaced in a longitudinal direction in a housing part 6 of the steering gear 2, is disposed on the output side of the steering gear 2. The entire housing should be regarded as the housing part 6 for this purpose, however it can optionally also be an individual operating element of the housing, such as a housing cover or similar part, for example.

Each end of the toothed rack 7 is connected to a tie rod 8. The connecting region between the toothed rack 7 and the tie rods 8 is sealed by respective bellows 9. Wheels 10 of the motor vehicle are provided in the known manner on the tie rods 8.

So as to be able to drain fluid, in particular water, upon entry thereof into the steering gear 2, a device 11 for exposing at least one opening 12 is provided on the housing part 6 of the steering gear 2, preferably at the lowest point. During normal operation, the opening 12 is closed by a closure element 13, whereby no liquid from the outside can penetrate into the steering gear 2.

An operating element 14 is provided in the device 11, the properties of operating element 14 changing upon contact with water. In the exemplary embodiment shown, the operating element 14 dissolves. The device 11 is provided with a central inflow opening 15. A cover part 16 is disposed over the inflow opening 15, which serves to discharge water from the interior of the steering gear 2. The inflow opening 15 is covered by the cover part 16 with respect to the interior of the steering gear 2.

The closure element 13 is located in the interior of the device 11 and prevents liquid from the outside from penetrating into the steering gear 2.

The closure element 13 is preloaded by a spring 18 so that the element is pressed against the operating element 14.

Figure 2:
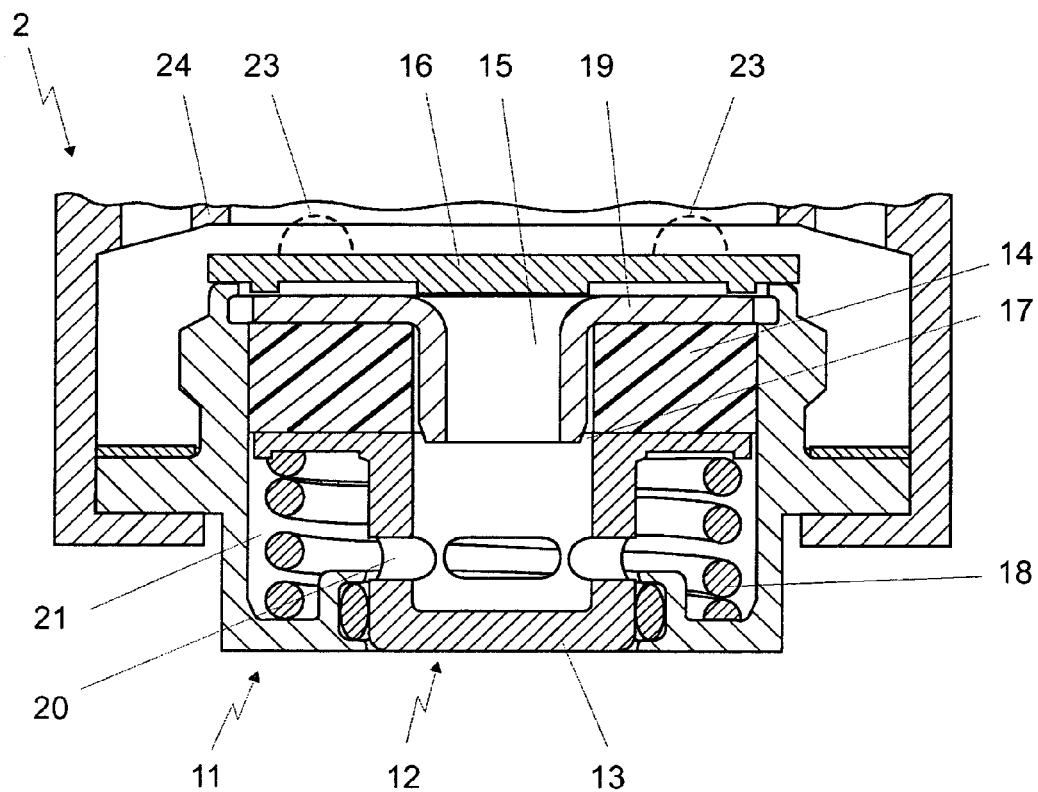
FIG. 2: shows a sectional view of the device according to the invention, together with the cover part, in the closed position.
Figure 3:
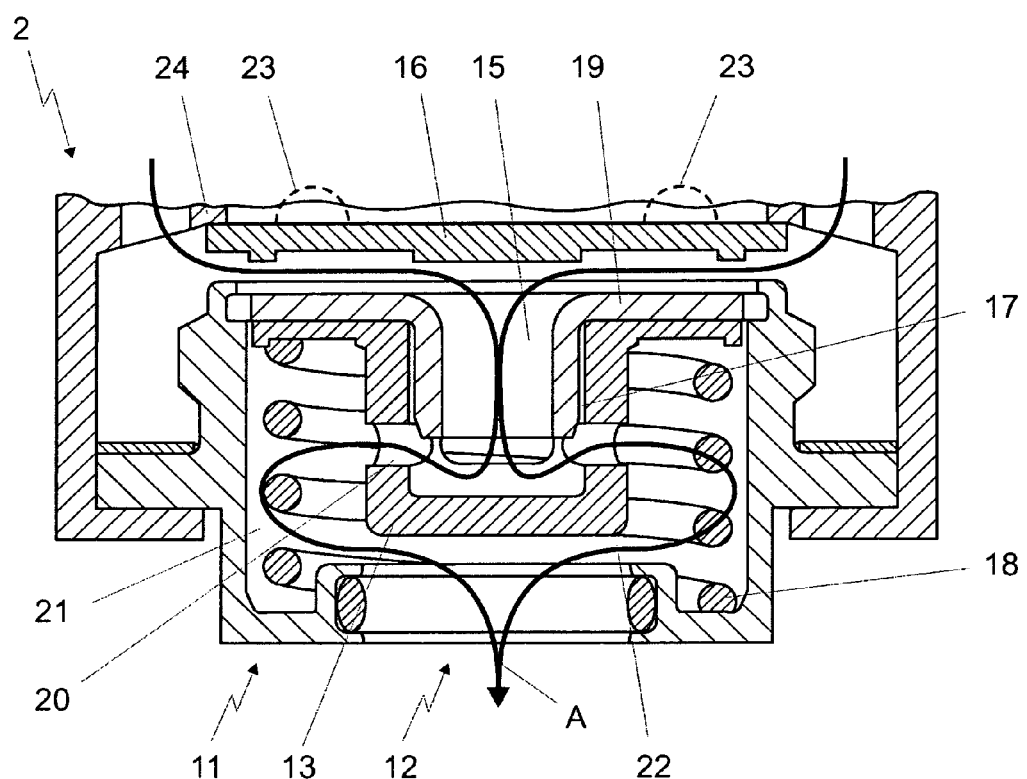
FIG. 3: shows a sectional view of the device according to the invention, together with the cover part, in the open position.

The operating principle of the device 11 is apparent from FIGS. 2 and 3. Because the cover part 16 is designed as a buoyant body, the part lifts off the sealing position thereof when water has penetrated into the interior of the steering gear 2. In the first step, the water can thus flow into the device 11 via the inflow opening 15. Water that has penetrated comes in contact with the operating element 14 by way of an annular gap 17 between apart of the housing of the device and the closure element 13 and thus dissolves. The operating element can be a urea tablet, for example, which dissolves upon contact with water.

As soon as the operating element has dissolved, a spring 18 pushes the closure element 13 upward into the space vacated by the dissolved operating element until the element is seated against the lower face of the upper end plate 19 of the device 11.

As can be seen from FIG. 3, the water that has penetrated can thus penetrate in accordance with the direction of the arrow A into the spring space 21 of the spring 18 by way of radial circumferential bores 20 in the closure element 13, and then drain via the opening 12 by way of a gap 22, which is created between the closure element 13 and an annular housing part of the device, as a result of the raised position of the closure element 13.

As a matter of course, the central position of the inflow opening 15 is to be understood to be merely an example. The same applies to the water passing through the device and exiting from the opening 12.

It is, of course, therefore also possible for one or more openings or boreholes to be provided in the end plate 19 over the operating element 14, instead of the central inflow opening 15. During normal operation, the cover part 16 covers the end plate 19. When the cover disk 16 lifts, water that has penetrated can then flow directly into the space in which the operating element 14 is located, by way of the now exposed boreholes in the end plate 19.

Instead of designing the cover disk 16 as a buoyant body, the specific weight of which is thus lighter than that of water, it is, of course, also possible to provide the cover disk 16 with one or more buoyant bodies 23, as is shown by way of example.

It is also apparent from FIG. 3 that an upper end face of the lifted cover part 16 is seated against a housing wall part 24 of the steering gear 2. As soon as the water that has penetrated into the steering gear has completely drained, the cover part 16 can thus drop back onto the device 11, and thus cover the inflow opening 15 again. As an alternative, however, using a suitable device, it is also possible to ensure that the cover part 16 remains in the raised position after being lifted once, whereby the inflow opening 15 remains permanently open.

It is advantageous to provide a sensor device, which signals the penetration of water into the steering gear and the lifting of the cover part 16.

Instead of being designed as a flat disk, the cover part 16 can also be provided with a central arbor, which is inserted into the central borehole (inflow opening 15) of the device 11, whereby the cover part 16 is rigidly connected to the device. In this case, several inlet openings in the end plate 19 are provided over the operating element 14, as was already proposed above. If the cover element is designed with appropriate elasticity, which is optionally amplified by buoyant bodies 23, the cover part 16 lifts off the end plate 19 in the manner of an inverted or "flipped" umbrella, and water can penetrate from the outside by way of the resulting annular gap. In this case, it must only be assured that appropriate elasticity or an articulated design of the cover part 16 is provided for radially outside the core of the cover part 16, so that the cover part 16 can lift off at the circumference thereof.

The invention claimed is:

1. A device for exposing at least one opening in a housing part of a steering gear in a vehicle steering system, comprising a closure element which closes the opening, and an operating element, at least one of the properties of which changes when coming in contact with a liquid so that the opening can be exposed by the closure element after cooperation of the operating element with the closure element the closure element being at least partially covered by a cover part, which is designed as a buoyant body, or is provided with one or more buoyant bodies, wherein the cover part completely exposes the opening when liquid makes contact with the cover part.

2. The device according to claim 1, wherein at least a portion of the cover part is designed in the shape of a disk.

3. The device according to claim 1, wherein a plurality of buoyant bodies are located toward a periphery of the cover part.

4. The device according to claim 1, wherein the cover part has elasticity.

5. The device according to claim 1, wherein the cover part closes the inflow opening again after the liquid has drained.

6. The device according to claim 1, wherein the cover part remains in the open position after activation.

* * * * *